United States Patent [19]
Gregg et al.

[11] Patent Number: 5,048,062
[45] Date of Patent: Sep. 10, 1991

[54] TRANSMITTING COMMANDS OVER A SERIAL LINK

[75] Inventors: Thomas A. Gregg, Highland; Leon Skarshinski, Red Hook, both of N.Y.

[73] Assignee: International Business Machines Corp., Armonk, N.Y.

[21] Appl. No.: 429,268

[22] Filed: Oct. 30, 1989

[51] Int. Cl.⁵ .............................................. H04L 7/00
[52] U.S. Cl. .................................. 375/114; 370/105.4
[58] Field of Search .................... 375/106, 114, 116; 370/81, 82, 83, 105.1, 105.4, 105.5, 110.1

[56] References Cited
U.S. PATENT DOCUMENTS

| | | | |
|---|---|---|---|
| 4,205,200 | 5/1980 | Parikh et al. | 370/83 |
| 4,486,739 | 12/1984 | Franaszek et al. | 341/59 |
| 4,517,669 | 5/1985 | Freeburg et al. | 370/82 |
| 4,531,210 | 7/1985 | Perry | 370/105.1 |
| 4,594,708 | 6/1986 | Servel et al. | 370/105.4 |
| 4,620,311 | 10/1986 | Immink | 375/19 |
| 4,683,567 | 7/1987 | Green et al. | 370/110.1 |
| 4,698,809 | 10/1987 | Munter | 370/30 |
| 4,719,624 | 1/1988 | Bellisio | 370/105.1 |
| 4,977,558 | 12/1990 | Iguchi et al. | 370/110.1 |

Primary Examiner—Stephen Chin
Attorney, Agent, or Firm—Floyd A. Gonzalez

[57] ABSTRACT

An apparatus and method for transmitting commands over a serial link having a switch intermediate a channel and a control unit wherein continuous sequences of idle characters (K.28.5) are sent over the link for maintaining character synchronization. Commands and response information is sent between ports of the switch and the channel and/or the control unit by modifying every other idle character to a modified idle character to which a command or response function has been assigned. In the modification, a selected number of the bits of the idle character are held invariant, and only those bits are varied which form data characters according to the rules of the 8B/10B encoding method. Code points for a total of 124 modified idle characters are disclosed to which a separate command or response may be assigned.

22 Claims, 5 Drawing Sheets

CHARACTER RECEIVED

| STATE | K28.5⁺ | K28.5⁻ | D.X.2 | OTHER |
|---|---|---|---|---|
| 0 | GO TO 1 | ERROR | FUNCTION OUT | SOF,ERROR |
| 1 | ERROR | GO TO 0 | FUNCTION OUT | SOF,ERROR |

TRANSMITTING COMMANDS OVER A SERIAL LINK

BACKGROUND OF THE INVENTION

The present invention relates to an apparatus and method for transmitting commands over a serial link, and more particularly relates the formation and detection of command sequences from serially transmitted binary characters.

In order to transmit data characters across a serial interface, the data characters are converted to transmission codes so that clocking can be recovered and AC coupling is possible. The code also typically provides for special characters outside the data alphabet for functions such as character synchronization, frame delimiters, abort, reset, idle and diagnostics. Transmission codes generally contain no DC and little low frequency content in order to DC isolate the transmission line from the driver and receiver circuitry, to reduce signal distortion on the line, and to assist in error detection.

U.S. Pat. No. 4,486,739, issued Dec. 4, 1984 to Franaszek et al. for "Byte Oriented DC Balanced (0,4) 8B/10B Partitioned Block Transmission Code" and assigned to the assignee of the present invention, discloses a binary code and an encoder circuit which translates an 8 bit byte of information into 10 binary digits for transmission over electromagnetic or optical transmission lines. Special K characters usable for character synchronization, frame delimiters, abort, reset, idle, diagnostics, etc. are generated by the encoder responsive to a control bit referred to as a K bit. Tables I and II show the resultant coding of data characters, and Table III shows the coding of K characters. To maintain DC balance, either an A form or a complementary B form of sub-blocks of data bits may be used according to the running disparity of the characters being transmitted.

U.S. Pat. No. 4,620,311, issued Oct. 28, 1986 to Schouhamer Immink for "Method of Transmitting Information, Encoding Device For Use in the Method, and Decoding Device For Use in the Method," discloses a method for converting n-bit information words into m-bit code words in which an A form of the code word and a B form of the code word are derived from each other by inversion and reversal.

U.S. Pat. No. 4,683,567, issued July 28, 1987 to Green et al. for "Asynchronous Signaling System For Digital Communication Channel," discloses continuously transmitting a selected one of a plurality of unique N-bit digital code words that corresponds to an associated signaling message. Each adjacent N-bits out of two identical back-to-back N-bit words that define the same unique word will not define a different unique word. Rather the N-bit words, called code words, from the back-to-back pair thereof are ordered permutations of the same ordered group of N-bits where one of them is called a primary code word that is identified with the unique word, and the others are called secondary code words.

U.S. Pat. No. 4,698,809, issued Oct. 6, 1987 to Munster for "Method and Apparatus for the Channelized Serial Transmission of Redundantly Encoded Binary Data," discloses a method of redundantly encoding $2^m$ encoded binary words wherein $m > n$, as well as circuits for for the encoding and decoding of the encoded binary words The m words exhibit x invariant bits between themselves and the n words and the m-x bits are mapped uniquely to the remaining n-w bits of the binary words.

SUMMARY OF THE INVENTION

The present invention provides for the generation of link level commands and responses by varying a minimum number of bits of an idle character to be sent over a single conductor of a two conductor link. The idle character and the modified character are transmitted in a sequence to form the mentioned link level command or response. The exact modification of the second character of the sequence determines the command or the response message of the sequence. Since the second character in the sequence is a modification of the idle character, the sequence maintains the synchronization of the link. The sequence may be used in place of, or in combination with, frames sent over links of computer I/O systems.

It is thus an object of the present invention to provide a command or response generation apparatus for use an a computer I/O system in which the commands and responses form a part of the link synchronization function.

It is another object of the present invention to provide an apparatus for generating a command or response for use in a computer I/O system in which the command or response is made up of a sequence of idle characters in which the second idle character is a modification of the first idle character.

It is another object of the present invention to provide an apparatus for modifying every other idle character in a string of idle characters, in which only a minimum number of bits are changed to form the modified idle character.

It is another object of the present invention to present a method for identifying the code points of the second modified idle character of an idle character sequence in which each code point may represent a separate command or response.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
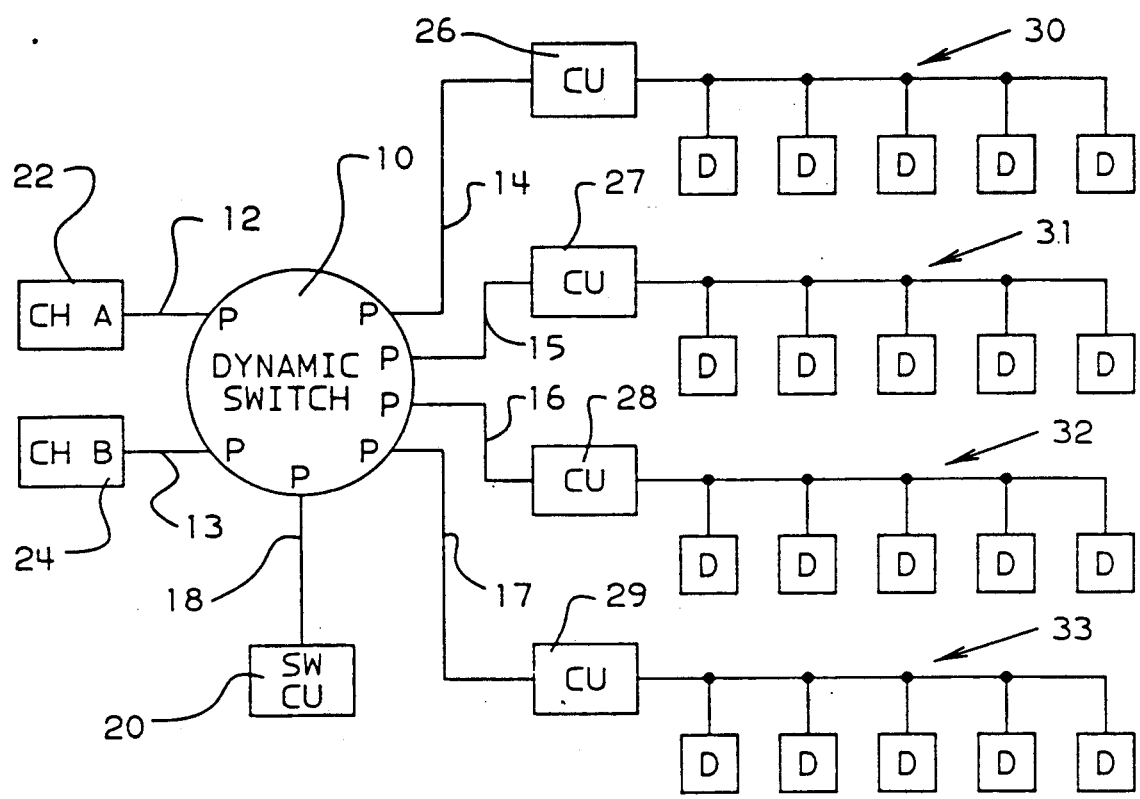
FIG. 1 is a block diagram of an I/O system having channels connected to control units through a dynamic switch.

FIG. 1 is a block diagram of the I/O system of a data processing system for making dynamic connections between the channel subsystem of the data processing system and control units. The I/O system includes a dynamic switch 10 having a plurality of ports P, each port P connected to one end of a plurality of links 12-18. One of the links 18 is connected to a dynamic switch control unit 20, and each of the other links 12-17 is connected to either a channel, such as channel A designated 22 or channel B designated 24, or to one of the control units 26-29. Each of the control units 26-29 control a plurality 30-33 of peripheral devices D, respectively.

Each of the channels 22 and 24 is a single interface on a system/370 or a 370-XA channel subsystem. The channels 22 and 24 direct the transfer of information between I/O devices of the pluralities 30-33 of devices D and main storage (not shown) of the data processing system and provide the common controls for the attachment of different I/O devices D by means of a channel path (to be defined). The channels 22 and 24 are serial channels wherein data is transmitted and received in a serial format, as will be explained.

Each of the links 12-18 is a point-to-point pair of conductors that may physically interconnect a control unit and a channel, a channel and a dynamic switch (such as links 12 and 13), a control unit and a dynamic switch (such as links 14-17), a dynamic switch and a switch control unit (such as link 18), or, in some cases, a dynamic switch and another dynamic switch. The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

Each of the control units 26-29 provides the logical capabilities necessary to operate and control an I/O device D and adapts the characteristics of each device D to the serial-I/O interface provided by the channel. The common facilities for executing channel commands, providing indications concerning the status of the I/O device, controlling the timing of data transfer over the channel path, and providing certain levels of device control are contained in the control unit.

Each of the control units 26-29 may have more than one serial-I/O interface in order to allow attachment to more than one link, each from a different channel or from a port on the same or a different dynamic switch. When a control unit provides more than one serial-I/O interface, these interfaces can be attached to links from channels and dynamic switches in any order and configuration. In the configuration shown in FIG. 1, when one of the serial-I/O interfaces of a control unit is attached to a link from a dynamic-switch port, that port must be connected to the port that is attached to the link from a channel in order for the control unit to be physically connected to that channel. When one of the serial-I/O interfaces of a control unit is attached to a link from a channel, the control unit and its I/O devices are accessible over that interface to only that channel. When one of the serial-I/O interfaces of a control unit is attached to a link from a dynamic switch, the control unit and its I/O devices may be physically accessible over that interface to all channels also attached to links from that dynamic switch.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in the aforementioned U.S. Pat. Nos. 4,605,928; 4,630,045; and 4,635,250, incorporated by reference herein In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic switch ports and their respective point-to-point links are interconnected by a switch matrix within the dynamic switch 10 such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

The dynamic switch can establish or remove a dynamic connection between two ports P based on the information provided by certain frame delimiters and other information included in the serial frames transmitted over the links, and based on conditions present at each of these ports P.

The dynamic switch 10 can establish or remove a static connection between two ports P as a result of commands received by means of the local or remote facilities of the dynamic-switch control unit 20. Frame delimiters or other sequences (to be explained) received at the port P have no effect on the static connection.

When a static connection exists between two ports P, the ports are in the static state. The static state is not affected by any information received from the link or from the statically connected port. If a sequence is received by one of two statically connected ports, the received sequence is normally retransmitted on the connected port's link. Frames may be received and transmitted simultaneously by statically connected ports.

In one embodiment, the dynamic switch 10 may have a maximum of 254 ports P. Since it takes two ports to make a connection, the maximum number of possible simultaneous connections is equal to half the number of ports P implemented. It will be understood that if the quantity of ports P is an odd number, then the maximum is half of the maximum number of ports P less one. A port P does not have a link address and, therefore, is not uniquely addressable. However, an association between a port P and either a destination link address or a source link address is provided by the dynamic switch The dynamic switch 10 has a matrix controller, discussed herein in connection with FIG. 2, which contains the information used to make and break connections between the ports P.

The dynamic switch 10 has one dynamic-switch control unit 20, which is assigned the unique link address of its link 18. The dynamic-switch control unit 20 is connected to the dynamic switch 10 as though it were attached to the dynamic switch by means of a port P and is available for dynamic connections like any other control unit attached to the dynamic switch 10. Through facilities provided by the dynamic-switch control unit 20, information for making changes can be made to the matrix controller of the dynamic switch 10 for an individual port P which alters the ability of that port to be dynamically connected with another port.

The connection and disconnection of the ports P in the dynamic switch 10 is fully explained in the copending patent application titled "Switch and Its Protocol for Making Dynamic Connections" by P. J. Brown et al., U.S. Patent application Ser. No. 07/429,267 filed Oct. 30, 1989, assigned to the assignee of the present invention and incorporated be reference herein.

Before communication over a channel path can occur, and before an I/O operation can be executed, some form of initialization must be completed according to the requirements of the system.

Figure 2:
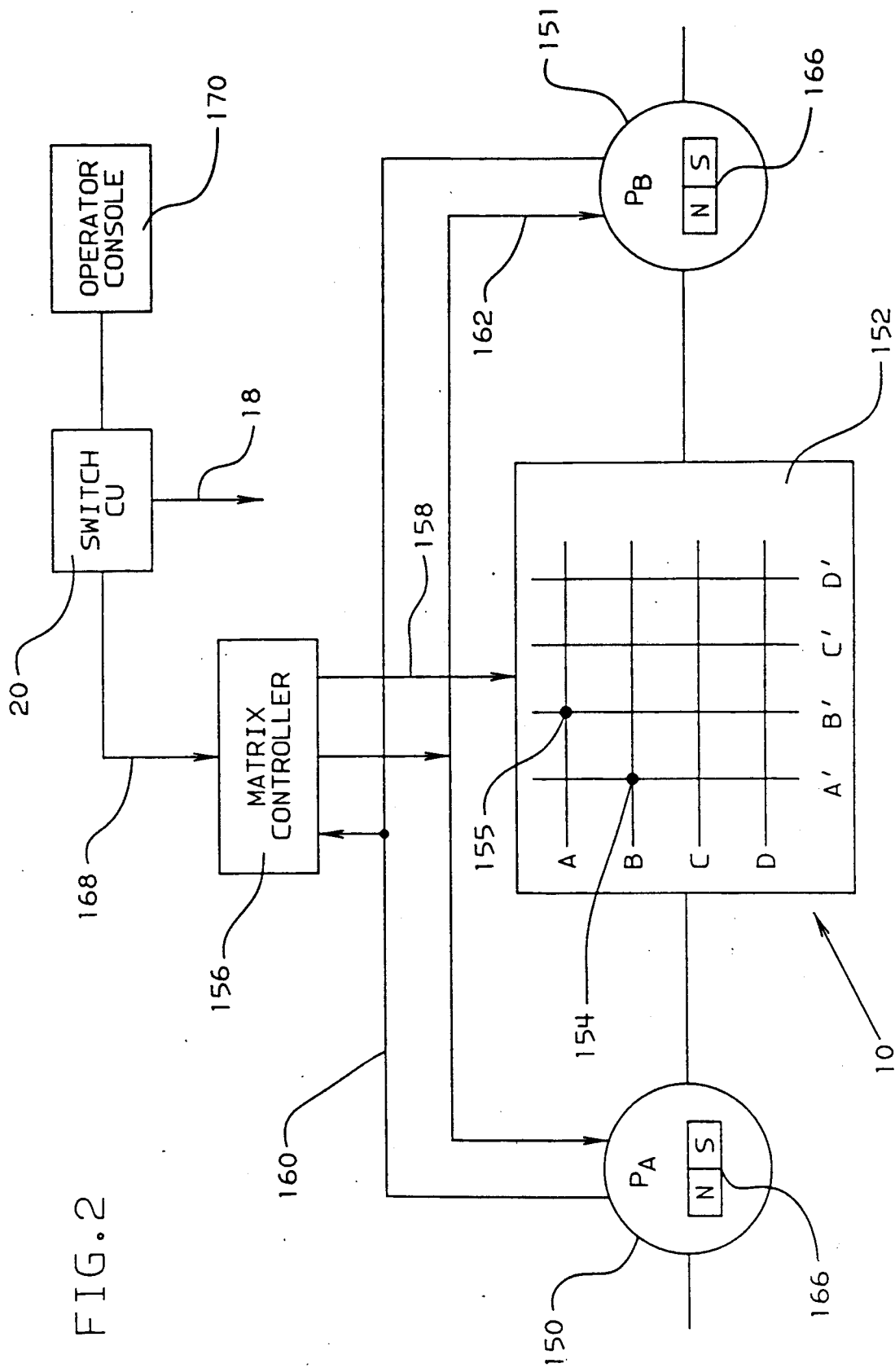
FIG. 2 is a block diagram of a dynamic switch and a dynamic switch control unit, wherein the dynamic switch has ports, a matrix, and a matrix controller.

FIG. 2 is a block diagram of the dynamic switch 10 of FIG. 1, and includes only two dynamic-switch ports $P_A$ 150 and $P_B$ 151. The ports $P_A$ 150 and $P_B$ 151 are connected through a double sided matrix 152. The matrix 152 is made up of a plurality of parallel horizontal conductors A–D and a plurality of parallel vertical conductors A'–D'. Switches 154 and 155 at the cross-points of conductors A and B' and B and A', respectively, have been closed by initiate-connection controls to make the two way connection of the ports 150 and 151, as previously described. The actual connections of the matrix 152 is controlled by a matrix controller 156 over a matrix address output bus 158. The matrix controller 156 contains storage for storing the connections of the ports of the dynamic switch 10, the allowable connections which may be made, whether the connections are dynamic or static, and other information for the operation of the dynamic switch 10.

The matrix controller 156 is connected the matrix 152 by the mentioned matrix address output bus 158, receives data from the ports 150 and 151 via a port input bus 160, and sends data to the ports 150 and 151 via a port output bus 162. Control signals over the bus 158 controls the cross-point switches of the matrix 152, such as switches 154 and 155.

Information needed to request dynamic connections is sent by the ports P to the matrix controller via bus 160, and the matrix controller 156 responds to the ports P with information saying the requested connections are rejected or allowed, as applicable. Each port P contains storage 166 for storing a port number assigned to the port at initialization, and the port's status. Thus, the port can send a reject frame back to a requesting source if the port is busy, or if the port is not busy, inform the matrix controller 156 of a requested connection to see if the request is allowed. When a port P sends a request to the matrix controller 156, the port number from the storage 166 in the port P is included so that the matrix controller knows which port sent the request.

The dynamic switch control unit 20 is connected to the matrix controller 156 by a dynamic switch control unit input bus 168 for such purposes as making static connections in the matrix 152, and grouping ports together into partitions such that a port P may only be connected to another port in the same partition. An operator console 170 is part of the dynamic switch control unit 20 for inputting the mentioned information, or the information may be sent to the dynamic switch control unit 20 via the link 18, which is connected to one of the ports P of the dynamic switch 10, as discussed in connection with FIG. 1.

Figure 3:
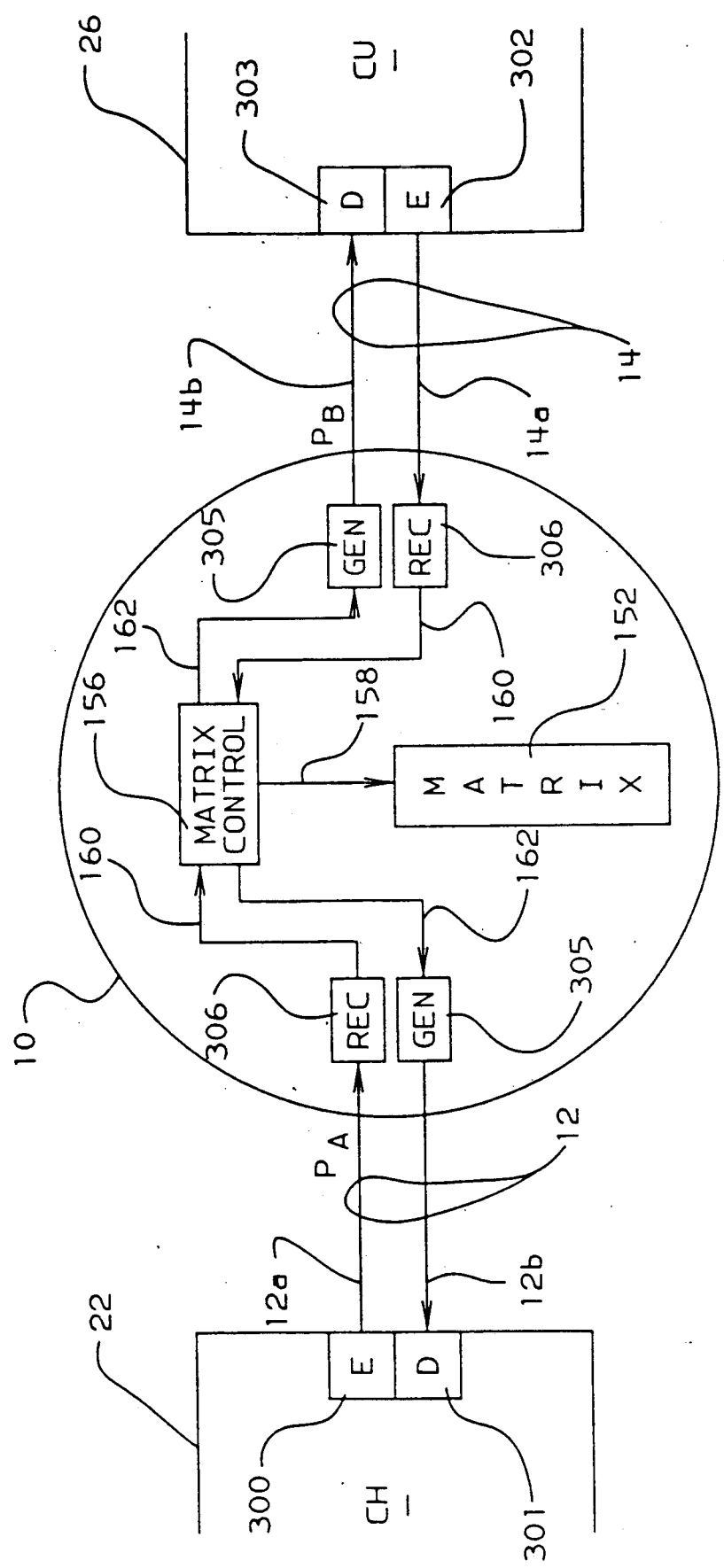
FIG. 3 is a diagram of a portion of the I/O system of FIG. 1 showing a channel, a portion of a dynamic switch and a control unit.

FIG. 3 is a diagram of a portion of the I/O system of FIG. 1 and shows the channel 22, the control unit 26 and the dynamic switch 10 connecting the channel 22 and the control unit 26 The connection is made through the matrix 152 via the ports $P_A$ and $P_B$, as previously explained. The link 12 has a transmit conductor 12a and a receive conductor 12b, and the link 14 has a transmit conductor 14a and a receive conductor 14b for transmitting and receiving data to and from the ports $P_A$ and $P_B$, respectively. The channel 22 has an encode circuit 300 and a decode circuit 301 for encoding and decoding, respectively, the 10 bit transmission characters from and to 8 bit data characters as described in the aforementioned U.S. Pat. No. 4,486,739. The control unit 26 has similar encode and decode circuits 302 and 303. Whenever frames are not being sent over the conductors 12a, 12b, 14a, or 14b, idle characters, such as the K character K.28.5 of Table III of U.S. Pat. No. 4,486,739, are transmitted to keep the links in synchronization. The idle character K.28.5 has two forms, a first form having a positive disparity (0011111010) and a second or alternate form having a negative disparity (1100000101). These forms are referred to herein as K28.5+ and K28.5− idle characters, respectively.

In addition to link-level commands contained in link-control frames, link-level commands may be sent to link-level facilities by means of continuous sequences of ordered sets of characters, as will be explained. The link-level facilities of FIG. 3 include the channel 22, ports $P_A$ and $P_B$ of the dynamic switch 10, and the control unit 26. A link-level command may be sent by an ordered set between the channel 22 and its connected port $P_A$, or between the control unit 26 and its connected port $P_B$. Such ordered sets may also be sent between the ports $P_A$ and $P_B$ if a connection has previously been made through the matrix 152.

As will be explained, link level communications may be sent over the links of the I/O system using ordered sets of idle characters transmitted over the link conductors such as conductors 12a, 12b, 14a, and 14b. These ordered sets are made up of alternating characters, with the first character being an idle character (either K28.5+ or K28.5−), and the second character being a modified idle character. In this way the links may be kept in synchronization while the link level commands of the ordered sets are being sent. The channel 22 and the control unit 26 may generate the ordered set desired by sending the proper 8 bit characters to their encoder circuits 300 and 302, respectively. The channel 22 and the control unit 26 also manipulate the K-bit, as required.

A sequence generator circuit 305 is provided in each port to generate the ordered sets, and a recognition circuit 306 is provided in each port to recognize the ordered sets received by the port. Ordered sets recognized by the recognition circuit 06 causes a FUNCTION OUT message to be transmitted over the bus 160 to the matrix controller 156 to carry out the recognized function, and the matrix controller 156 sends a FUNCTION IN message over the bus 162 to the sequence generator 305 to generate the desired ordered set to be sent by the port. The FUNCTION OUT message may be, for instance, a disconnect order to the port, or a disable command to take the port out of service, as desired. The FUNCTION IN message may be used to indicate that the port is out of order, for instance when an error in the data or a break in a conductor in the port's link is detected, or to form a response to a link level command such as a disconnect, or may be used to form an idle sequence.

Figures 4, 6:
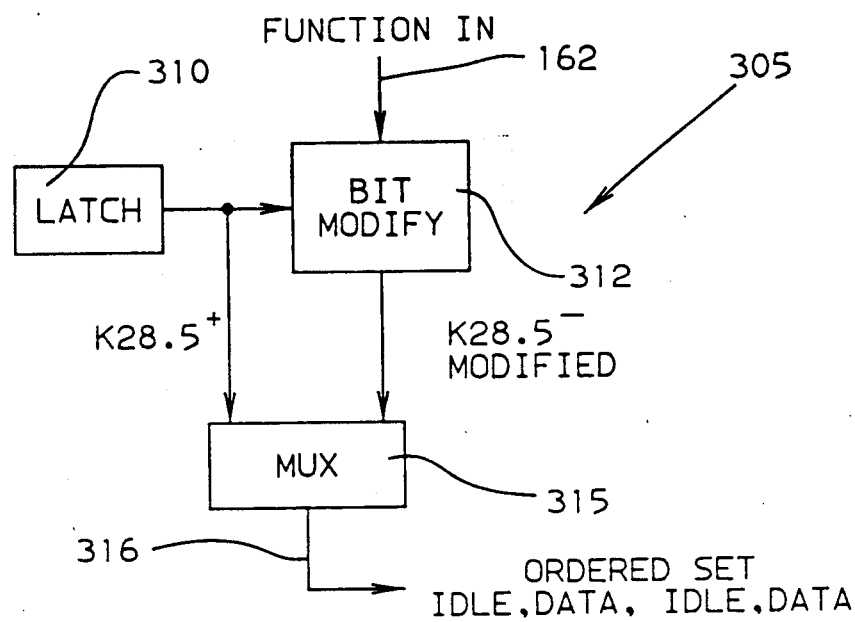
FIG. 4 is a block diagram of a sequence generator of the dynamic switch of FIG. 3.
FIG. 6 a state diagram of a state machine of the recognition circuit of FIG. 5.

FIG. 4 is a diagram for the sequence generator 305 which modifies the K28.5− idle character to the second character of an ordered set. The sequence generator 305 of FIG. 4 includes a register 310 for storing a K28.5 idle character. The register 310 is connected to a bit modify circuit 312 which receives the K28.5 idle character from the register 310 and changes the least number of bits possible to form a modified idle character. The number of bits of the K.28.5 idle character changed is responsive to a FUNCTION IN message over bus 162 such that selected different characters may be constructed by the bit modify circuit 312 to generate different link-level commands, as desired.

The idle register 310 and the modify circuit 312 are connected to a multiplexer 315, which multiplexes first a K28.5 idle character from register 310 and then a modified idle character from bit modify circuit 312 onto an output conductor 316. The sequence of characters on 316 thus form an ordered set of alternating characters, where the first character is a K28.5 character, and the second character is a modified idle character from bit modify circuit 312.

In a preferred embodiment, the latch 310 is a latch which, when clocked, inverts all of its contained bits and transmits the inverted bits to the modify circuit 312 and the multiplexer 315. It will be understood that on the first clock, a K28.5+ idle character is sent to the multiplexer 315 to be placed on the conductor 316 as the first character of the ordered set, and, on the next clock, a K28.5− is sent to the modify circuit 312 where it is modified and then multiplexed on the conductor 316 as the second character of the ordered set. Thus, in this embodiment, the circuit is simplified in that the modified idle characters generated always have a negative disparity and modified idle characters having a positive disparity do not have to be generated. As will be explained, the recognition circuit 306 detects ordered sets in which the first character may be either a K28.5+ or a K28.5− idle character, and in which the second character may have either a corresponding negative or a positive disparity for forming ordered sets having zero disparities.

Bits of the K28.5 idle character to be modified by the bit modify circuit 312 are selected such that the resultant modified idle character is a character which follows the 8B/10B code translation rules of the U.S. Pat. No. 4,486,739. The modified idle characters are, in one preferred embodiment, data characters as explained in the aforementioned U.S. Pat. No. 4,486,739 and shown in Tables I and II of that patent. In the illustrated embodiment, only the negative disparity or K.28.5− idle character is modified, as previously explained, to give negative disparity data characters. Table A shows the resulting characters when N bits of the K.28.5− idle character are held invariant, and X bits are varied in the pattern, as shown. As shown in Table A herein, the K.28.5− character is established as the beginning or base character, and the other valid 8B/10B characters are arranged in sequence such that the first 8B/10B data character has the maximum of its least significant bits in the same pattern as the base character and the last 8B/10B character in the sequence has none of its least significant bits in the same pattern as the base character. The Total Avail column of Table A herein shows the number of ordered sets which are available using the resultant data characters. The abbreviations tabulated in the character column are the same as the character abbreviations used in Table I (first six bits) and Table II (last 4 bits) of U.S. Pat. No. 4,486,739. In Table A herein, the idle character K.28.5− is counted as one available ordered set.

TABLE A

| N | PATTERN abcdeifghj | CHARACTERS (OR ADDED CHARACTERS) | TOTAL AVAIL |
|---|---|---|---|
| 10 | 1100000101 | K28.5- (IDLE SEQUENCE) | 1 |
| 9 | X100000101 | none | 1 |
| 8 | XX00000101 | none | 1 |
| 7 | XXX0000101 | D00.2-,D15.2- | 3 |
| 6 | XXXX000101 | D16.2-,D24.2-,D31.2- | 6 |
| 5 | XXXXX00101 | D01.2-,D02.2-,D04.2-,D08.2- | 10 |
| 4 | XXXXXX0101 | D23.2-,D27.2-,D29.2-,D29.2-,D30.2- | 14 |
| 3 | XXXXXXX101 | none | 14 |
| 2 | XXXXXXXX01 | D00.1-,D01.1-,D02.1-,D04.1-,D08.1-D15.1-,D16.1-,D23.1-,D24.1-,D27.1-D29.1-,D30.1-,D31.1-D03.7-,D05.7-,D06.7-,D07.7-,D09.7-D10.7-,D12.7-,D17.7-,D18.7-,D19.7-D20.7-,321.7-,D22.7-,D25.7-,D26.7-D28.7- | 43 |
| 1 | XXXXXXXXX1 | D00.3-,D01.3-,D02.3-,D04.3-,D08.3-D15.3-,D16.3-,D23.3-,D24.3-,D27.3-D29.3-,D30.3-,D31.3- | 56 |
| 0 | XXXXXXXXXX | D03.0-,D05.0-,D06.0-,D07.0-,D09.0-D10.0-,D11.0-,D12.0-,D13.0-,D14.0-D17.0-,D18.0-,D19.0-,D20.0-,D21.0-D22.0-,D25.0-,D26.0-,D28.0-D03.4-,D05.4-,D06.4-,D07.4-,D09.4-D10.4-,D11.4-,D12.4-,D13.4-,D14.4-D17.4-,D18.4-,D19.4-,D20.4-,D21.4-D22.4-,D25.4-,D26.4-,D28.4-D00.5-,D01.5-,D02.5-,D04.5-,D08.5-D15.5-,D16.5-,D23.5-,D24.5-,D27.5-D29.5-,D30.5-,D31.5- | 124 |

TABLE A-continued

| N | PATTERN abcdeifghj | CHARACTERS (OR ADDED CHARACTERS) | TOTAL AVAIL |
|---|---|---|---|
| | | D00.6-,D01.6-,D02.6-,D04.6-,D08.6-<br>D15.6-,D16.6-,D23.6-,D24.6-,D27.6-<br>D29.6-,D30.6-,D31.6-<br>D11.7-,D13.7-,D14.7- | |

Figure 5:
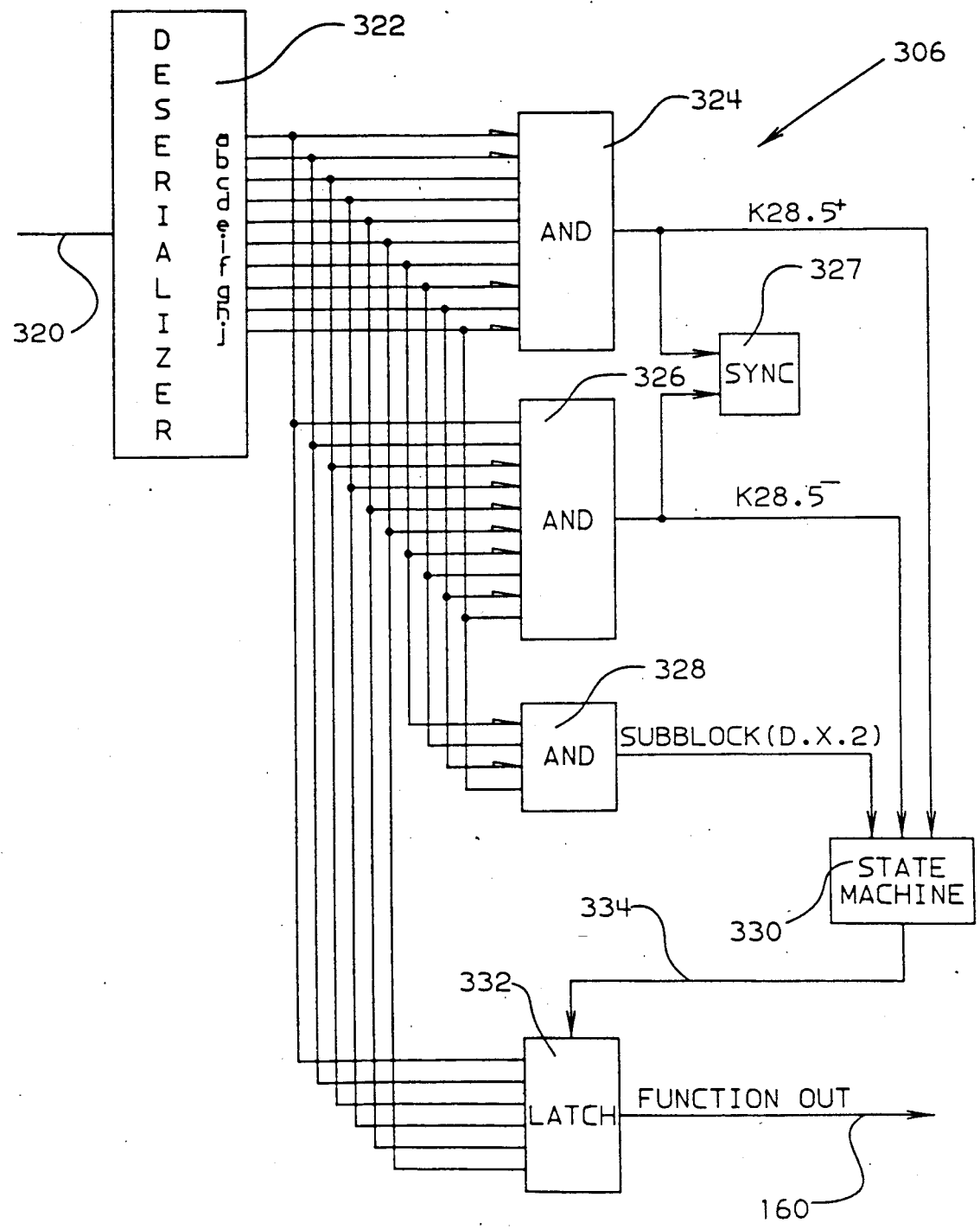
FIG. 5 is a block diagram of a recognition circuit of the dynamic switch of FIG. 3.

FIG. 5 is a diagram of the recognition circuit 306 of FIG. 3. The embodiment of FIG. 5 is used to decode an ordered set received by the port. The recognition circuit 306 includes a deserializer circuit 322 whose input 320 is connected to the serial link, such as 12a or 14a, for receiving the serial ordered sets from either the channel 22 or the control unit 26. The outputs of the deserializer 322 are labeled abcdeifghj to correspond with the labels of the coded characters of Tables I and II of the aforementioned U.S. Pat. No. 4,486,739. A first multiple-input AND gate 324 detects K28.5+ characters, and a second multiple-input AND gate 326 detects K28.5− characters. a synchronizing circuit 327 is connected to the outputs of the AND gates 324 and 326 to synchronize the receipt of the data bits by the AND gates 324 and 326 until either a K28.5+ or a K28.5− character is recognized. Such synchronizing circuits are well known and will not be discussed further.

A third multiple-input AND gate 328 detects the least significant bits of the character from the deserializer 322 to detect the invariant bits of the character. Referring to Table A, it will be understood that if bits fghj are monitored for the D.X.2− characters (0101), a total of 14 characters are available, each character for representing a separate function of a link level command. This can also be seen in Table II of U.S. Pat. No. 4,486,739, wherein the D.X.2 entry does not have an alternate pattern for the fghj bits. The outputs of the AND gates 324, 326 and 328 are connected to a state machine 330, whose output is connected to a latch 332 via conductor 334. The inputs of the latch 332 are connected to the most significant bits of the output of the deserializer 322, and are latched by latch 332 as the FUNCTION OUT message to the matrix controller 156 via bus 160.

FIG. 6 is a state diagram of the state machine 330 of FIG. 5. When the state machine 330 is in state o and receives a K28.5+ character, as detected by AND gate 324, it goes to state 1. When the state machine 330 is in state 1 and receives a K28.5− character, as detected by AND gate 326, it goes to state 0. If the state machine 330 is in state 0 and a K28.5− character is detected (two K28.5− characters are detected in a row) or is in state 1 and detects a K28.5+ character (two K28.5+ characters in a row), an error is indicated. If the state machine is in either state 0 or state 1, and the sub-block is detected by the AND gate 328 (a D.X.2 in the present embodiment), the most significant bits of the data character are latched as the FUNCTION OUT message.

It will be noted that when a FUNCTION OUT is detected, the state of the state machine 330 is not changed such that the state machine 330 is in condition to receive the next idle character without reporting an error. If a character other than a D.X.2 character is detected, further decoding must be done to determine if a start of frame (SOF) sequence has started or an error has occurred. SOF sequences are outside the scope of the present invention and will not be discussed further.

It will be understood that the state machine 330 may be embodied in either hardware or microprocessor controlled software, as well understood in the art.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. Apparatus for generating commands in a system wherein multi-bit characters are continuously sent from a sender to a receiver to acquire character synchronization, said apparatus comprising:

register means for providing a multi-bit idle character;

bit modifying means connected to said register means for changing selected bits of said multi-bit idle character for forming a command character which is a modification of said multi-bit idle character; and multiplexing means for forming an ordered set of characters, said ordered set having said multi-bit idle character as a first character and said command character as a second character.

2. The apparatus of claim 1 wherein said register means is a latch in which the bits of each successive multi-bit idle character are inverted from the previously provided multi-bit idle character such that said first character of said ordered set has a first disparity and said second character of said ordered set has a second, opposite disparity.

3. The apparatus of claim 2 wherein said first character of said ordered set is a K28.5+ idle character and said second character of said ordered set is a modified K28.5− idle character.

4. An apparatus for receiving synchronizing multi-bit characters, said apparatus comprising:

a recognition circuit having an input for receiving an ordered set and an output for providing a FUNCTION OUT message, said recognition circuit having detection means for detecting a first idle character in said received ordered set and latch means for providing said FUNCTION OUT message responsive to a second character in said received ordered set;

a first detector in said detection means for detecting an idle character having a first disparity; and a second detector in said detection means for detecting an idle character having a second, opposite disparity.

5. The apparatus of claim 4 further comprising:

sequence generating means having an input and an output, said sequence generating means generating ordered sets of characters on its output wherein the first character of each ordered set is an idle character and the second character of each ordered set is a modification of said idle character.

6. The apparatus of claim 5 wherein said first detector detects a K28.5+ idle character and said second detector detects a K28.5− idle character.

7. The apparatus of claim 5 wherein said first detector and said second detector have outputs, and said recognition circuit further comprises a synchronization means connected to the outputs of said first and second detectors, said synchronization means for synchronizing said first and second detectors until one of said first or second detectors detects a first idle character of one of said ordered sets.

8. The apparatus of claim 7 wherein said recognition circuit further comprises a state machine connected to the outputs of said first and second detectors, said state machine having an error state representative of two idle characters having the same disparity being detected in a row.

9. The apparatus of claim 8 wherein said latch means latches selected ones of the most significant bits of said second character as said FUNCTION OUT message.

10. The apparatus of claim 9 wherein said detection means further comprises a third detector for detecting a selected sub-block of least significant bits of said second character, said selected sub-block of least significant bits being selected to be invariant in selected available characters of said second character.

11. The apparatus of claim 10 wherein said third detector has an output connected to said state machine, said state machine having an idle detect state representative of an idle character being detected by said detection means, and a FUNCTION OUT state representative of said sub-block being detected by said third detector, said state machine only allowing state moves to said FUNCTION OUT state from said idle detect state such that FUNCTION OUT messages are provided upon the detection of said ordered sets.

12. A method of selecting a second character of an ordered set wherein the first character of said ordered set is an idle character and the second characters is a command character, said method comprising the steps of:
  a. establishing said idle character as a base character;
  b. arranging all valid 8B/10B data characters in sequence such that the first 8B/10B data character has the maximum number of its least significant bits in the same pattern as the base character and the last 8B/10B data character in the sequence has none of its least significant bits in the same pattern as the base character; and
  c. selecting the number of 8B/10B data characters in the sequence as the number of command characters desired such that the maximum number of least significant bits of the command characters are invarient from the base character.

13. A data transmission apparatus synchronized by the continuous transmission of multi-bit characters, said data transmission apparatus comprising:
  a switch having at least two ports; and
  a switch controller for controlling switching between said ports by said switch;
  each of said ports including an input for receiving data characters transmitted to said port and an output for sending data characters transmitted from said port;
  each of said ports further including a recognition circuit having an input for receiving an ordered set of said multi-bit characters from its attached link and an output connected to said switch controller for providing to said switch controller a FUNCTION OUT message, said recognition circuit having detection means for detecting a first idle character in said received ordered set, and latch means for providing said FUNCTION OUT message responsive to a second character in said received ordered set.

14. The data transmission system of claim 13 wherein said detection means comprises a first detector for detecting an idle character having a first disparity, and a second detector for detecting an idle character having a second, opposite disparity.

15. The data transmission apparatus of claim 14 wherein said first detector detects a K28.5+ idle character and said second detector detects a K28.5− idle character.

16. The data transmission apparatus of claim 15 wherein said first detector and said second detector have outputs, and said recognition circuit further comprises a synchronization means connected to the outputs of said first and second detectors, said synchronization means for synchronizing said first and second detectors until one of said first or second detectors detects a first idle character of one of said ordered sets.

17. The data transmission apparatus of claim 16 wherein said recognition circuit further comprises a state machine connected to the outputs of said first and second detectors, said state machine having an error state representative of two idle characters having the same disparity being detected in a row.

18. The data transmission apparatus of claim 17 wherein said latch means latches selected ones of the most significant bits of said second character as said FUNCTION OUT message.

19. The data transmission apparatus of claim 18 wherein said detection means further comprises a third detector for detecting a selected sub-block of least significant bits of said second character, said selected sub-block of least significant bits being selected to be invariant in selected available characters of said second character.

20. The data transmission apparatus of claim 19 wherein said third detector has an output connected to said state machine, said state machine having an idle detect state representative of an idle character being detected by said detection means, and a FUNCTION OUT state representative of said sub-block being detected by said third detector, said state machine only allowing state moves to said FUNCTION OUT state from said idle detect state such that FUNCTION OUT messages are provided upon the detection of said ordered sets.

21. The data transmission apparatus of claim 20 further comprising:
  sequence generating means having an input and an output, said sequence generating means generating ordered sets of characters on its output wherein the first character of each ordered set is an idle character and the second character of each ordered set is a modification of said idle character.

22. The data transmission apparatus of claim 13 further comprising:
  a link attached to each port, each of said links having two data transmission conductors, one data transmission conductor connected to the input of the attached port for transmitting data to the attached port and the other data transmission conductor connected to the output of the attached port for transmitting data from the attached port; and
  a link-level facility attached to each link for sending data to and receiving data from the attached port.

* * * * *